Feb. 26, 1935. A. BARRETT 1,992,732
VALVE
Filed Dec. 12, 1933
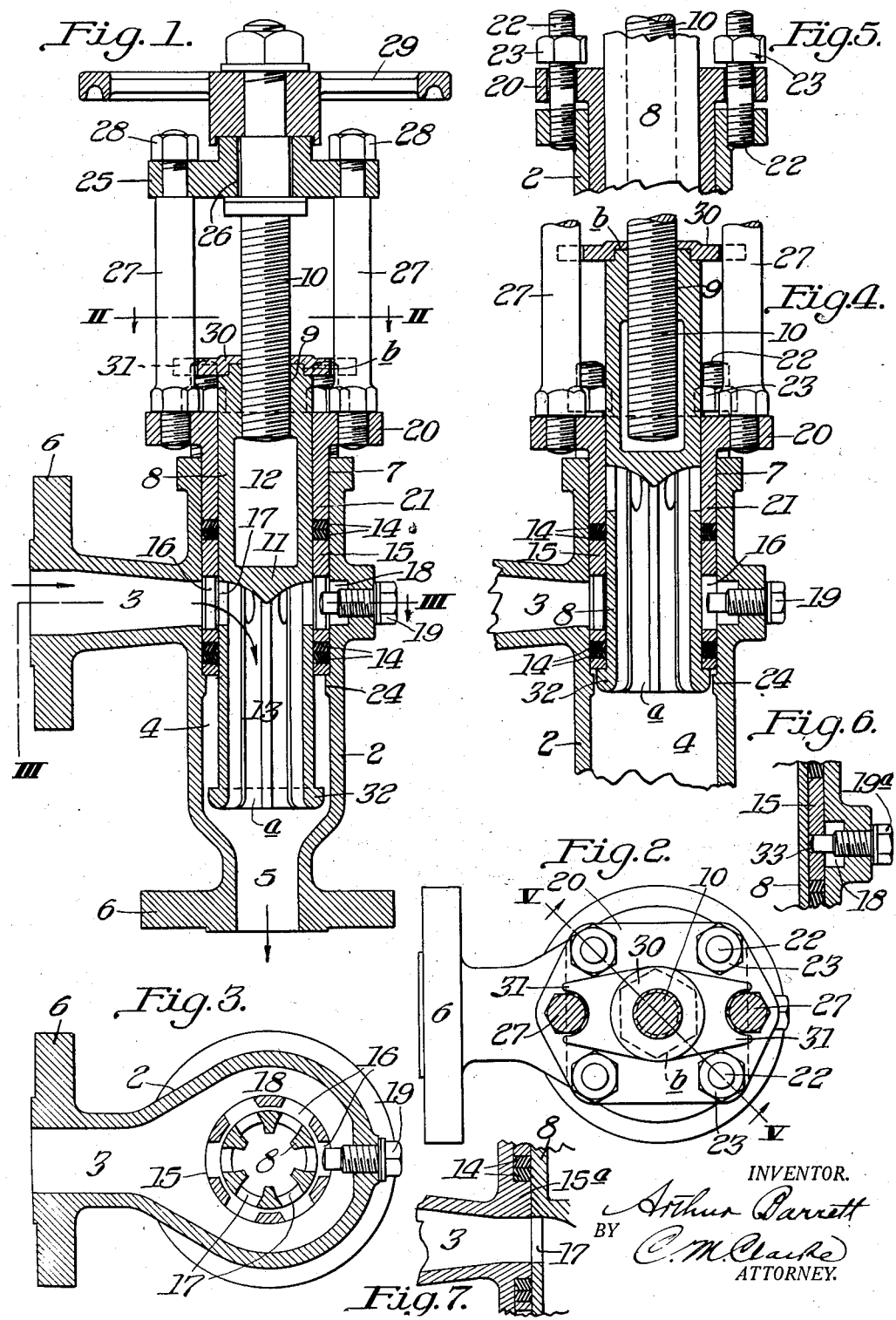

Patented Feb. 26, 1935

1,992,732

UNITED STATES PATENT OFFICE 1,992,732

VALVE

Arthur Barrett, Bellevue, Pa.

Application December 12, 1933, Serial No. 701,974

9 Claims. (Cl. 251—80)

This invention relates to improvements in piston or plunger valves of the blow-off type, and is particularly directed to a sealing or packing mechanism therefor, coacting with the movements of the valve to prevent the escape of fluid.

For example, my invention has particular adaptation to steam blow-off valves wherein the piston or plunger principle is preferred over the well known seated valve, due to the erosion hazard of the sediment and scale entrained with the discharging steam.

In valves of this character, it has been the practice to employ a packing train comprising a plurality of ring-shaped elements disposed between the piston or plunger and the wall of the valve chamber, which train is subjected to compression to effect sealing contact with said valve and wall.

Generally, the inner end of such packing train bears against a fixed abutment within the valve chamber, and the compression takes place from the other or outer end of the packing. Obviously, this compression is primarily effective only throughout the outer portion of the packing, until the compression pressure is increased considerably.

The high compression pressure necessary under such present methods crushes and weakens the packing, thereby shortening its life. Also, the said packing becomes so firmly imbedded in the valve body as to necessitate special tools for removal thereof.

To eliminate these and other undesirable features, I have provided a packing train positioned in the usual manner, having means whereby initial compression may be applied to the outer portion, and simultaneous equal and opposite compression pressure is applied throughout the entire packing train with and by the closing movement of the valve, to effect an efficient seal.

A further object of the invention is to provide for easy and complete removal of the packing train when it is desired to replace the same.

Additional objects and advantages will become apparent from the following description taken in connection with the accompanying drawing, wherein:

Fig. 1 is a longitudinal sectional view taken through a piston or plunger type blow-off valve embodying my invention, showing the valve in open position;

Fig. 2 is a transverse section taken on the line II—II of Fig. 1;

Fig. 3 is a transverse section taken on the line III—III of Fig. 1;

Fig. 4 is a view of a portion of Fig. 1, showing the valve raised in closed position;

Fig. 5 is a detail sectional view taken along the line V—V of Fig. 2;

Fig. 6 is a fragmentary section through a portion of the side wall of the valve, showing a modified locking bolt construction; and Fig. 7 is a similar section, at the inlet side of the valve, showing a modified construction having resisting shoulders for the packing incorporated in the valve body.

Referring to the drawing, 2 designates a hollow open-ended valve body having a lateral fluid inlet passage 3 communicating with the interior cylindrical valve chamber 4. An outlet passage 5 is provided in one end of said body in communication with the chamber, said passages 3 and 5 being preferably formed with flanged portions 6 for attachment with suitable inlet and outlet conduits, and the like.

Adapted to be entered in the chamber 4 through the open end 7 of the valve body 2, hereinafter referred to as the outer end of said body, I provide a non-rotatable reciprocable piston or plunger valve member 8, having threaded engagement 9 at its outer end with a rotatable threaded valve stem 10.

Said valve 8 is hollow and cylindrical in form, having an intermediate transverse wall 11 extending between an outer stem-receiving cavity 12 and a fluid passage 13 communicating with the chamber 4 through the open inner end *a* of the valve.

Disposed between the outer surface of the valve and the cylindrical wall of the chamber 4, I provide a packing train consisting of inner and outer ring-shaped packing elements 14 disposed at either end of an intermediate sleeve or bushing 15.

The sleeve 15 surrounds the valve 8 and is provided with a plurality of radial ports 16 adapted to register with corresponding ports 17 in the valve 8.

The said valve ports 17 are preferably located immediately adjacent the transverse wall 11 of the valve, which wall preferably has a curved surface converging inwardly of the valve passage 13, to assist the change of direction of fluid passing through the valve.

Ported sleeve 15 is normally positioned in the transverse plane of the inlet passage 3 for communication by its ports 16 with a surrounding annular chamber 18 formed in the body 2.

A locking screw or bolt 19 extends radially inward to engage by its terminal in one of the sleeve ports 16 as shown in Figs. 1, 3 and 4, thereby securing the sleeve in its proper relation to the valve body, but permitting reciprocation thereof within the chamber 4.

Entered in the open end 7 of the valve body 2 and surrounding the valve 8 is a flanged packing follower 20 for engaging the outermost packing element 14 by its inner end 21. Said follower 20 is secured to the body 2 by a plurality of threaded studs 22 having nuts 23 for exerting inward pressure on the follower to induce an initial compression on the outer packing elements, the innermost packing element 14 of the train having abutting engagement with an inner annular shoulder 24 formed on the wall of the body 2.

The valve stem 10 is mounted for non-rising rotation in relation to the follower 20 in a cross-head member 25 having a central bearing 26 for said stem, and fixedly spaced from the follower by means of side posts 27. Said posts 27 are shouldered at each end and screw threaded into the follower flange and are secured to the cross-head 25 by threaded nuts 28, thereby forming a yoke construction providing a bearing for the stem. 29 designates a hand wheel on the stem for rotating the stem 10 and actuating the valve.

A cross-head 30 is fixed to the outer end of the valve 8 in any suitable manner, as by a hexagon shoulder b, and has bifurcated ends 31 engaging and sliding on the posts 27 to prevent rotation of said valve throughout its reciprocation by the stem 10.

While the valve 8 is in the open position of Fig. 1, leakage escape of fluid from the body 2 at its outer end is prevented by the initial compression on the outermost packing elements 14 as described. However, when the valve is moved to closed position, as in Fig. 4, it is necessary to effect a more complete compression throughout the entire packing train.

For this purpose, the inner end of the valve member is provided with a terminal laterally extending shoulder or annular head 32. As the valve is reciprocated outwardly by rotation of its stem to closed position, the said head 32 engages the innermost packing element 14.

The resistance encountered by the head on engaging with the inner end of the packing reacts through the threaded engagement 9 of the valve 8 with its stem 10, and inward thrust of posts 27, to induce a simultaneous equal and opposite inward compression on the outer end of the packing train by the follower 20, said follower moving inwardly on the studs 22 away from the nuts 23 thereof, as shown in Figs. 4 and 5.

Thus, at the closing of the valve, an equal and opposite compression pressure is applied to the opposite ends of the packing train, which pressure acts uniformly in effecting sealing engagement thereby.

A similar equal and opposite compression is attained when the ported sleeve 15 is fixed as in Fig. 6, the lock screw 19a engaging and fitting within a small opening 33 to prevent reciprocation of the sleeve.

It will also be obvious that sleeve 15 may be fixedly held or incorporated within the body or casing 2 by any other means, as by making it integral therewith. I show in Fig. 7 such a modified construction in which the sleeve 15 is substituted by an inwardly thickened wall 15a having upper and lower shoulders for abutting engagement of packing 14. Such construction will operate in the same manner, providing opposing fixed resistance for the packing when compressed inwardly towards both shoulders. In such case the lower opening of the casing should be enlarged for downward removal of the valve, because of the absence of clearance upwardly of head 32.

To remove the packing train, as for replacement or renewal, the nuts 23 and screws 19 or 19a are removed. An outward movement of the valve mechanism will then remove the valve and follower, the shouldered head 32 of said valve engaging the inner packing retaining ring element to remove the entire ported sleeve and its packing train, as will be readily understood.

It is therefore seen that I have provided a novel means for effecting equal compression of the packing train by and with the valve movement, and a construction lending itself to ready repair and replacement. It will also be clear that, due to the elasticity of the packing 14, there will be simultaneous release of any binding or friction on the valve immediately when the valve is lowered towards the open position of Fig. 1.

While the invention is illustrated as applied to a blow-off valve, it is to be noted that said invention is not to be limited thereto, as the same may be incorporated in other similar types of valves without departure therefrom.

What I claim is:

1. The combination with a hollow valve body and a valve movable therein having registrable circulating ports, of a packing train disposed therebetween having a co-operating registering port and packing elements on opposite sides of the port, and oppositely movable means for applying compression pressure to opposite ends of said packing train when the valve is in one position.

2. The combination with a hollow valve body and a valve movable therein having registrable circulating ports, of a packing train disposed therebetween having a co-operating registering port and packing elements on opposite sides of the port, and oppositely movable means for simultaneously applying compression pressure to opposite ends of said packing train when the valve is in one position.

3. The combination with a hollow valve body and a valve reciprocable therein having registrable circulating ports, of means for reciprocating said valve, a packing train comprising a ported sleeve having a co-operating registering port disposed between the valve and wall of the body and packing elements on opposite sides of the port, and oppositely movable means coacting with and by a movement of the valve in one direction for applying compression pressure to opposite ends of said packing train.

4. The combination with a hollow valve body having an inlet and an outlet port and a valve reciprocably movable therein having a circulation port registrable with the inlet port when the valve is in one position, of means for reciprocating the valve to open and closed positions, a packing train comprising a sleeve disposed between the valve and the wall of said body having a circulating port registering with the valve body inlet port, and packing elements surrounding the valve and engaging the sleeve at opposite sides of its port, means for applying pressure to each of said packing train elements, said means coacting with and by a closing movement of the valve to apply compression pressure to opposite ends of said packing train.

5. In a valve of the character described, a hollow body having inlet and outlet passages, a valve reciprocable therein for effecting communication between said passages, a rotatable non-rising stem having threaded connection with the outer portion of the valve, a packing train disposed between the valve and wall of the body and having a circulating port registering with said passages, an inwardly movable packing follower for engaging the outer end of said train and non-reciprocably connected to said stem, said valve having a lateral head on its inner portion for engaging the inner end of the packing train upon outward movement of the valve, whereby compression pressure is applied to opposite ends of said packing train.

6. A valve of the character described comprising a hollow body having inlet and outlet passages, a valve reciprocable therein and having ports for effecting communication between said passages when the valve is in open position, a packing train between the valve and wall of the body having a circulating port registering with said passages, a movable packing follower for engaging one end of the train, a valve stem rotatable and in non-reciprocable relation to the follower and having threaded engagement with the valve, said valve having a laterally extending head for engaging the other end of the packing train, whereby equal and opposite compression pressure is applied to said train upon closing the valve by rotation of the stem.

7. A valve of the character described comprising an open-ended hollow body having inlet and outlet passages, a non-rotatable ported valve reciprocable therein, a ported sleeve between the valve and wall of the body for permitting communication between said passages and valve ports when the valve is in open position, inner and outer packing elements at the ends of the sleeve, a packing follower slidable in an open end of the body for engaging the outer packing element, a valve stem rotatable and in non-reciprocable relation to the follower and having threaded engagement with the valve, said valve having a laterally extending head for engaging the inner packing element, whereby equal and opposite compression pressure is applied to the packing elements upon closing the valve by rotation of the stem.

8. The combination with a hollow valve body having a circulating passageway and a valve movable therein for controlling the flow of fluid through said passageway; of a sleeve having a port registrable with said passageway, compressible packing elements for preventing port leakage between the valve and valve body at the sides lengthwise of the sleeve beyond its port, an actuating screw for the valve, and means on the valve and connected therewith for simultaneously exerting opposing pressure on the packing elements when the valve is moved to closed position.

9. The combination with a hollow valve body having a circulating passageway and a valve movable therein for controlling the flow of fluid through said passageway, of a sleeve having a port registrable with said passageway, compressible packing elements for preventing port leakage between the valve and valve body at the sides lengthwise of the sleeve beyond its port, an actuating screw for the valve, a packing follower non-reciprocably connected with the screw for exerting pressure on one packing element, and a terminal head on the valve exerting simultaneous pressure on the other packing element when the valve is moved to one position.

ARTHUR BARRETT.